US 7,261,917 B2
Horikawa et al. (45) Date of Patent: Aug. 28, 2007

(54) PLASMA DISPLAY AND METHOD OF PRODUCING PHOSPHOR USED THEREIN

(75) Inventors: Keiji Horikawa, Kyoto (JP); Masaki Aoki, Osaka (JP); Kazuhiko Sugimoto, Kyoto (JP); Yuichiro Miyamae, Osaka (JP); Junichi Hibino, Kyoto (JP); Tanaka Yoshinori, Osaka (JP); Setoguchi Hiroshi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 201 days.

(21) Appl. No.: 10/536,362

(22) PCT Filed: Sep. 24, 2004

(86) PCT No.: PCT/JP2004/014431

§ 371 (c)(1),
(2), (4) Date: May 26, 2005

(87) PCT Pub. No.: WO2005/031785

PCT Pub. Date: Apr. 7, 2005

(65) Prior Publication Data

US 2006/0071588 A1    Apr. 6, 2006

(30) Foreign Application Priority Data

Sep. 26, 2003   (JP) ............................. 2003-335270

(51) Int. Cl.
*C09K 11/08*   (2006.01)
*H01J 11/02*   (2006.01)

(52) U.S. Cl. .................. 427/157; 427/64; 252/301.36; 252/301.4 R; 313/582; 313/486

(58) Field of Classification Search ................ 313/486
See application file for complete search history.

(56) References Cited

U.S. PATENT DOCUMENTS 7,037,156 B2 *   5/2006   Nishimura et al. ............ 445/24

FOREIGN PATENT DOCUMENTS

| JP | 54-145386 | 11/1979 |
|---|---|---|
| JP | 2-283791 | 11/1990 |
| JP | 6-145659 | 5/1994 |
| JP | 11-86735 | 3/1999 |
| JP | 2001-234165 | 8/2001 |
| JP | 2001-236893 | 8/2001 |
| JP | 2003-183649 | 7/2003 |

* cited by examiner

OTHER PUBLICATIONS

Phosphor Handbook, pp. 219-220, published from Ohm Co., Ltd.

*Primary Examiner*—Nimeshkumar D. Patel
*Assistant Examiner*—Anthony Perry
(74) *Attorney, Agent, or Firm*—Wenderoth, Lind & Ponack, L.L.P.

(57) ABSTRACT

The present invention relates to a plasma display device and to a method of producing a phosphor to be used for the device, that prevents the phosphor layer from deteriorating, and improves the luminance, life, and reliability, of the PDP. The plasma display device is equipped with a plasma display panel in which a plurality of discharge cells are arranged, phosphor layers (110R, 110G, 110B) in color corresponding to each discharge cell are allocated, and phosphor layers (110R, 110G, 110B) are excited by ultraviolet light to emit light. Green phosphor layer (110G) has a green phosphor including $Zn_2SiO_4$:Mn, the element ratio of zinc (Zn) to silicon (Si) is 2/1 to 2.09/1 at least at the proximity of the surface, and the layer is positively charged or zero-charged.

4 Claims, 5 Drawing Sheets

PLASMA DISPLAY AND METHOD OF PRODUCING PHOSPHOR USED THEREIN

This application is a U.S. National Phase Application of PCT International Application PCT/JP2004/014431.

TECHNICAL FIELD

The present invention relates to a plasma display device having phosphor layers that are excited by ultraviolet light to emit light, and to a method of producing a phosphor used for the device.

BACKGROUND ART

In recent years, plasma display devices using plasma display panels (hereinafter, referred to as "PDP" or "panel") receive attention as color display devices that implement a large screen size, thin body, and a light weight in displaying color images for computers, television sets, and the like.

A plasma display device displays full color by means of additive color mixing of so-called three primary colors (red, green, and blue). For displaying full color, a plasma display device is provided with phosphor layers that emit light in the three primary colors: red (R), green (G), and blue (B). Phosphor particles composing the phosphor layers are excited by ultraviolet light occurring in a discharge cell of the PDP, to generate visible light in each color.

Compounds used for the above-mentioned phosphors in each color include $(YGd)BO_3:Eu^{3+}$ and $Y_2O_3:Eu^{3+}$ for emitting red light; $Zn_2SiO_4:Mn^{2+}$ for green; and $BaMgAl_{1}.OO_{17}:Eu^{2+}$ for blue. These phosphors, after given raw materials being mixed therewith, are produced with a solid-phase reaction by being fired at a temperature above 1,000° C. This method is disclosed in "Phosphor Handbook (in Japanese)" (p. 219 to p. 220, by Ohmsha, Ltd., 1991), for example.

The phosphor particles produced by firing, after being lightly crushed to the extent of breaking aggregated particles but not the crystals, are screened (average particle diameter for red and green: 2 μm to 5 μm, for blue: 3 μm to 10 μm) before use. The reason for lightly crushing and screening (classifying) phosphor particles is as follows. That is, methods of forming a phosphor layer in a PDP include screen-printing of pasted phosphor particles in each color, and an ink-jet method, in which the paste is discharged through a nozzle for applying. Large agglomerates are included in a phosphor unless the phosphor particles are classified after being lightly crushed, and thus unevenness in coating and clogging in the nozzle may occur when coating the paste with the phosphors. Therefore, phosphors classified after being lightly crushed are small in particle diameter and even in particle size distribution, thus yielding a more desirable coated surface.

An example method of producing a green phosphor made of $Zn_2SiO_4:Mn$ is disclosed in "Phosphor Handbook (in Japanese)" (pp. 219-220, Ohmsha, Ltd., 1991). That is, $SiO_2$ is blended in ZnO at the rate of $1.5ZnO/SiO_2$, which is larger than its stoichiometric ratio ($2ZnO/SiO_2$), and then fired at 1,200° C. to 1,300° C. in the air (at one atmospheric pressure) to produce a green phosphor. In this case, the surface of the $Zn_2SiO_4:Mn$ crystal is covered with an excessive amount of $SiO_2$, and the phosphor surface is negatively charged.

The fact that a green phosphor in a PDP, negatively charged with a high level, degrades in its discharge characteristic, is disclosed in Japanese Patent Unexamined Publications No. H11-86735 and No. 2001-236893, for example. Further, it is known that ink-jet coating, in which coating is made continuously with ink for a negatively charged green phosphor through a fine-bore nozzle, causes clogging in the nozzle and unevenness in coating. These are because ethyl cellulose in the ink is in particular presumably resistant to being adsorbed in the surface of the negatively charged green phosphor.

Further, there is a problem in which a negatively charged phosphor causes ion collision of a negatively charged green phosphor with positive ions of Ne, CH-base, or H occurring while discharging, thus deteriorating the luminance of the phosphor.

Meanwhile, some methods are formulated such as laminate-coating a positively charged oxide for changing negative charge on the surface of $Zn_2SiO_4:Mn$ to positive one, and mixing a positively charged green phosphor for apparently positive charge. However, it is problematic that laminate-coating oxide causes a low luminance, and applying two different kinds of phosphor with a different charge state tends to generate clogging and unevenness in coating. In addition, there is a method in which ZnO and $SiO_2$ are blended in advance at the ratio of 2:1 or more (2/1 or more of Zn/Si in element ratio) when producing $Zn_2SiO_4:Mn$, and ZnO is scattered (sublimed) in advance while firing, using the vapor pressure of ZnO that is higher than that of $SiO_2$, when firing the phosphor in the air or in nitrogen at one atmospheric pressure at 1,200° C. to 1,300° C. However, even in such a case, the proximity of the crystal surface results in rich $SiO_2$ and is negatively charged by all means.

The present invention, in view of these problems, aims at preventing phosphor layers from deteriorating and at improving the luminance, life, and reliability of a PDP.

SUMMARY OF THE INVENTION

In order to achieve this purpose, the plasma display device of the present invention is equipped with a plasma display panel in which a plurality of discharge cells are arranged, phosphor layers are allocated with a color corresponding to each discharge cell, and the phosphor layers are excited by ultraviolet light to emit light. The phosphor layers include a green phosphor layer containing $Zn_2SiO_4:Mn$, and the green phosphor made of $Zn_2SiO_4:Mn$ has the element ratio of zinc (Zn) to silicon (Si) of 2/1 or more at least at the proximity of the surface, and Mn is used as an activator.

In such a makeup, phosphor particles in which the green phosphor crystal is positively charged or zero-charged allow the phosphor layer to be formed with an even coating, prevent the luminance degradation of the phosphor, and improve luminance, life, and reliability of the PDP.

DETAILED DESCRIPTION OF PREFERRED EMBODIMENTS

Figure 1:
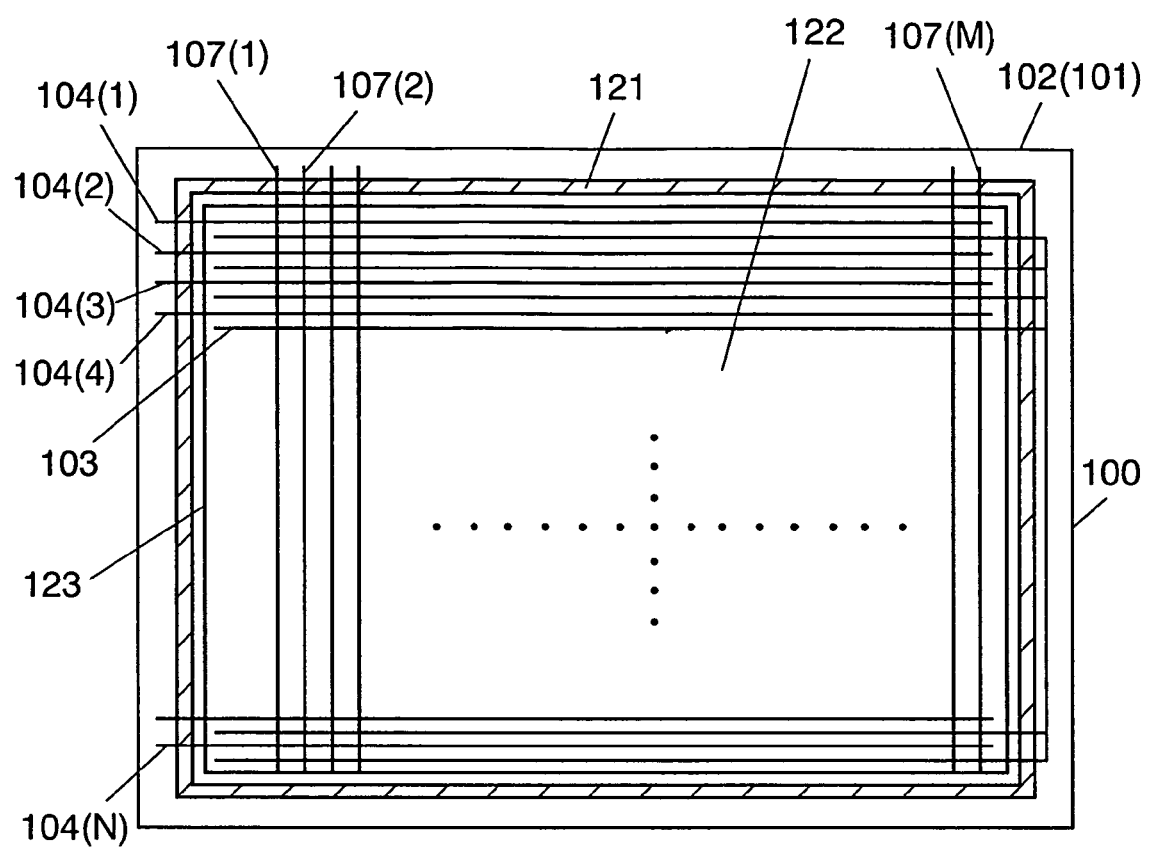
FIG. 1 is a plan view illustrating a state of a PDP with its front glass substrate removed, used for a plasma display device according to an embodiment of the present invention.

In the present invention, ZnO, $SiO_2$, and $MnO_2$ are mixed as an activator when producing a green phosphor made of $Zn_2SiO_4$:Mn having the zinc silicate crystal structure, then this mixture is pre-fired in the air at 600° C. to 900° C. to produce pre-fired powder, and next the pre-fired powder is actually fired at 1,000° C. to 1,350° C., completely shielded with ZnO powder, to produce $Zn_2SiO_4$:Mn.

The green phosphor made of $Zn_2SiO_4$:Mn, used for a PDP, is usually produced with a solid-phase reaction method, where $SiO_2$ is blended in ZnO at a rate larger than its stoichiometric ratio, for improving luminance. This results in the surface of the $Zn_2SiO_4$:Mn crystal being covered with $SiO_2$. However, even if the green phosphor is produced at the stoichiometric ratio so that the surface will not be covered with $SiO_2$, firing at 1,000° C. or higher causes ZnO at the proximity of the surface to be scattered (sublimed) early, due to the vapor pressure of ZnO higher than that of $SiO_2$, which results in more $SiO_2$ on the surface of the phosphor. If the pre-fired powder is fired at 1,000° C. or lower so that ZnO will not be scattered (sublimed), although $Zn_2SiO_4$:Mn with its Zn/Si ratio of 2/1 is synthesized, a high-luminance phosphor is not produced due to its low crystallinity.

The present invention solves the above-mentioned problem with the following method. That is, set the element ratio of ZnO to $SiO_2$ to be blended between 2.1/1 and 2.0/1, put a mixture of $Zn_2SiO_4$:Mn into a crucible and completely enclose (shield) its periphery with ZnO in order to prevent the ZnO from being scattered (sublimed), and then fire the covering ZnO in an oven at a temperature slightly higher than that of $Zn_2SiO_4$:Mn in the crucible, in an atmosphere of $N_2$ (nitrogen), $N_2$—$H_2$ (nitrogen-hydrogen), and/or $N_2$—$O_2$ (nitrogen-oxygen), to prevent the ZnO from being scattered (sublimed). In other words, enclose the periphery of pre-fired $Zn_2SiO_4$:Mn powder with ZnO, set the temperature of this ZnO to a slightly higher one, and set the saturated vapor pressure at the ZnO side at the firing temperature relatively high, to prevent the ZnO in the pre-fired $Zn_2SiO_4$:Mn powder from being scattered (sublimed).

Hereinafter, a description will be made of a method of producing a phosphor according to the present invention.

Methods of producing a phosphor body itself include the following. That is, one method is solid-phase sintering, where an oxidized or carbonated raw material, and flux are used. Another method is a liquid-phase method, where a precursor of a phosphor is produced with hydrolysis of an organometallic salt or nitrate salt in an aqueous solution, or with coprecipitation that precipitates organometallic salt or nitrate salt with alkali or the like added, and then the precursor is heat-treated to produce pre-fired powder. Yet another method is liquid spraying, where an aqueous solution with raw materials for a phosphor added is sprayed in a heated oven.

The present invention reveals that using a phosphor precursor and pre-fired powder produced with any of the above methods prevents ZnO from being scattered from its surface while firing, and is effective in improving the characteristic of $Zn_2SiO_4$:Mn phosphor, if $Zn_2SiO_4$:Mn is shielded ($Zn_2SiO_4$:Mn powder is sealed with ZnO.) with ZnO while fired at 1,000° C. or higher, and then actually fired at 1,000° C. to 1,350° C.

As an example of a method of producing a green phosphor, a description will be made of a process of producing a green phosphor with solid-phase reaction method according to the present invention. Blend carbonate and oxide as the raw materials, such as ZnO, $SiO_2$, and $MnCO_3$, with a slightly larger amount of ZnO over $SiO_2$ as compared to the molar ratio of the base material $((Zn_{1-x}Mn_x)_2SiO_4)$ for a phosphor. (The element compounding ratio of ZnO to $SiO_2$ is 2.1/1 to 2.0/1.) Next, after mixing the materials, pre-fire them at 600° C. to 900° C. for two to three hours. Then put them into a crucible (made of $Al_2O_3$ or ZnO), enclose the periphery of the crucible containing the pre-fired powder, with ZnO powder or a ZnO crucible, and set the temperature in the oven so that the temperature of the ZnO crucible or ZnO powder will be relatively higher. Next, fire them under this temperature setting (at 1,000° C. to 1,350° C.) in an atmosphere of at least one of $N_2$, $N_2$—$H_2$, and $N_2$—$O_2$, to produce a green phosphor.

Alternatively, in a liquid-phase method, where a phosphor is produced from an aqueous solution, the following process is employed. That is, dissolve organometallic salt (e.g. alkoxide, acetylacetone) or nitrate salt, into water in advance so that the element ratio of Zn/Si will be 2.1/1 to 2.0/1, and then hydrolyze it to produce a coprecipitate (hydrate). Next, pre-fire it at 600° C. to 900° C. in the air. After that, in the same way as in the aforementioned solid-phase reaction method, enclose the periphery of the crucible containing the pre-fired powder, with ZnO powder or a ZnO crucible, and set the temperature in the oven so that the temperature of the ZnO crucible or ZnO powder will be relatively higher. Next, fire them under this temperature setting (at 1,000° C. to 1,350° C.) in an atmosphere of at least one of $N_2$, $N_2$—$H_2$, and $N_2$—$O_2$, to produce a green phosphor.

In this way, when pre-fired powder produced with a slightly larger amount of ZnO over $SiO_2$ as compared to the stoichiometric ratio is shielded with ZnO, and fired at 1,000° C. to 1,350° C., ZnO is prevented from being scattered (sublimed) from the surface of $Zn_2SiO_4$:Mn, because the vapor pressure of the ZnO used for shielding is higher than that of the ZnO in the pre-fired powder. Therefore, unlike conventional $Zn_2SiO_4$:Mn, the proximity of the surface does not result in rich $SiO_2$, but $Zn_2SiO_4$:Mn with slightly rich ZnO, extending to the inside is produced. This allows for the producing of a green phosphor with its $Zn_2SiO_4$:Mn particles favorably charged positively.

Here, the reason for limiting the ratio of Zn to Si to between 2.1/1 and 2.0/1 is to facilitate positively charging $Zn_2SiO_4$ by means of a slightly excessive amount of Zn elements. Further, with the Zn ratio of 2.1 or more, the amount of Zn in the crystal lattice increases to lower the luminance, while with 2.0 or less, $Zn_2SiO_4$ tends to be charged negatively. Accordingly, the ratio of Zn to Si is desirably between 2.1/1 and 2.0/1.

The reason for limiting the firing temperature to between 1,000° C. and 1,350° C. is the following. That is, at 1,000° C. or lower, the vapor pressures of both ZnO and $SiO_2$ are low, and thus a small amount of ZnO is scattered (sublimed) from the surface, and is resistant to generating a $SiO_2$-rich layer at the proximity of the surface. However, a high-luminance phosphor is not produced due to poor crystallization of $Zn_2SiO_4$:Mn. Meanwhile, at 1,350° C. or higher, the vapor pressure of ZnO becomes relatively high as compared to that of $SiO_2$. This causes the covering of $Zn_2SiO_4$:Mn with ZnO to be less effective. Besides, excessively sintered $Zn_2SiO_4$ causes a large particle diameter, thus lowering the luminance.

Next, a description will be made of a phosphor in each color used for a plasma display device according to the present invention. Concrete phosphor particles used for a green phosphor layer are desirably those made from [$(Zn_{1-x}Mn_x)_2SiO_4$] produced with the aforementioned method, and the value of x satisfies $0.01 \leq x \leq 0.2$, for advantages in luminance and luminance degradation.

For concrete phosphor particles used for a blue phosphor layer, a compound expressed by $Ba_{1-x}MgAl_{10}O_{17}:Eu_x$ or $Ba_{1-x-y}Sr_yMgAl_{10}O_{17}:Eu_x$ can be utilized. Here, the values x and y of the compound are desirably $0.03 \leq x \leq 0.20$, and $0.1 \leq y \leq 0.5$, respectively, for high luminance.

For concrete phosphor particles used for a red phosphor layer, a compound expressed by $Y_{2-x}O_3:Eu_x$ or $(Y, Gd)_{1-x}BO_3:Eu_x$ can be utilized. Here, the value x of the compound for a red phosphor is desirably $0.05 \leq x \leq 0.20$, for advantages in luminance and luminance degradation.

Hereinafter, a description will be made of an embodiment of a plasma display device according to the present invention, referring to the drawings.

Figure 2:
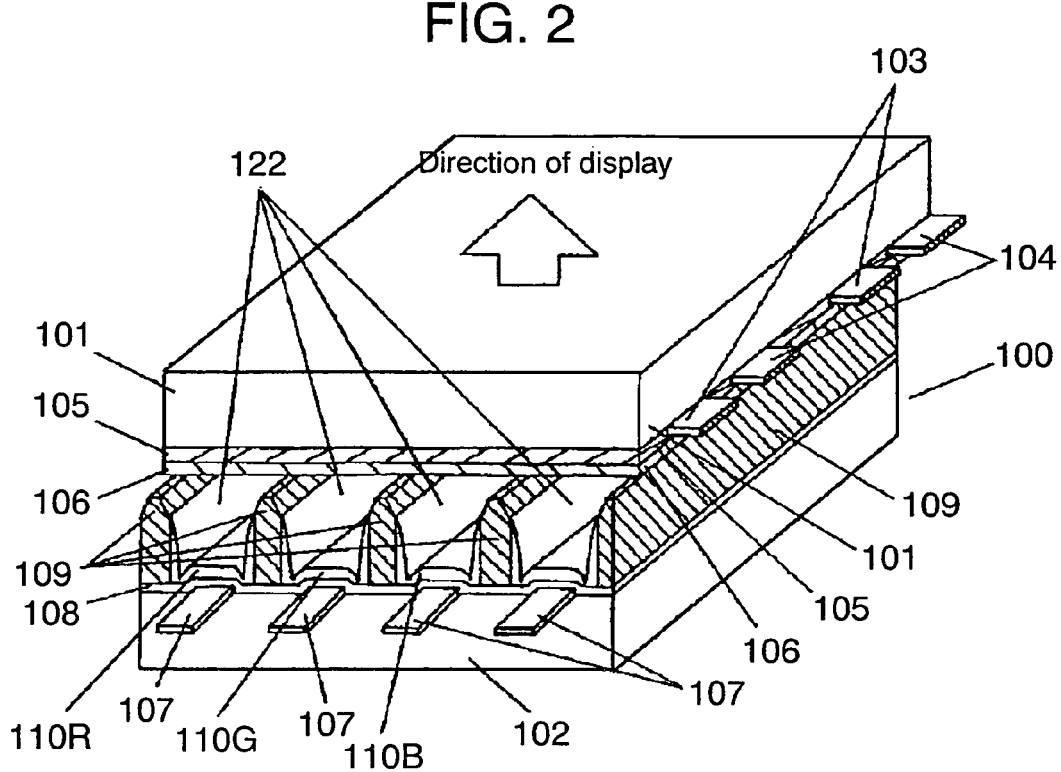
FIG. 2 is a perspective view illustrating the structure of the image display area of the PDP.

FIG. 1 is a plan view illustrating a state of a PDP with its front glass substrate removed, used for the plasma display device according to the embodiment of the present invention. FIG. 2 is a perspective view illustrating the structure of the image display area of the PDP. Here, FIG. 1 shows display electrodes, display scan electrodes, and address electrodes, with some of them omitted so as to be easily understood.

As shown in FIG. 1, PDP 100 is composed of front glass substrate 101 (not illustrated), rear glass substrate 102, N pieces of display electrode 103, N pieces of display scan electrode 104 (N is affixed for showing the Nth one), a group of M pieces of address electrode 107 (M is affixed for showing the Mth one), and hermetic seal layer 121 shown by oblique lines. PDP 100 has an electrode matrix with a three-electrode structure composed of display electrode 103, display scan electrode 104, and address electrode 107; and a display cell is formed at the intersecting point of display electrode 103 and display scan electrode 104, and address electrode 107, forming image display area 123.

This PDP 100, as shown in FIG. 2, is composed of a front panel allocated with display electrode 103, display scan electrode 104, dielectric glass layer 105, and MgO protective layer 106, all on one main surface of front glass substrate 101; and a back panel allocated with address electrode 107, dielectric glass layer 108, barrier rib 109, and phosphor layers 110R, 110G, and 110B, all on one main surface of rear glass substrate 102. PDP 100 has a structure in which discharge gas is encapsulated in discharge space 122 formed between the front panel and the back panel, and is connected to PDP driver 150 shown in FIG. 3, to compose a plasma display device.

Figure 3:
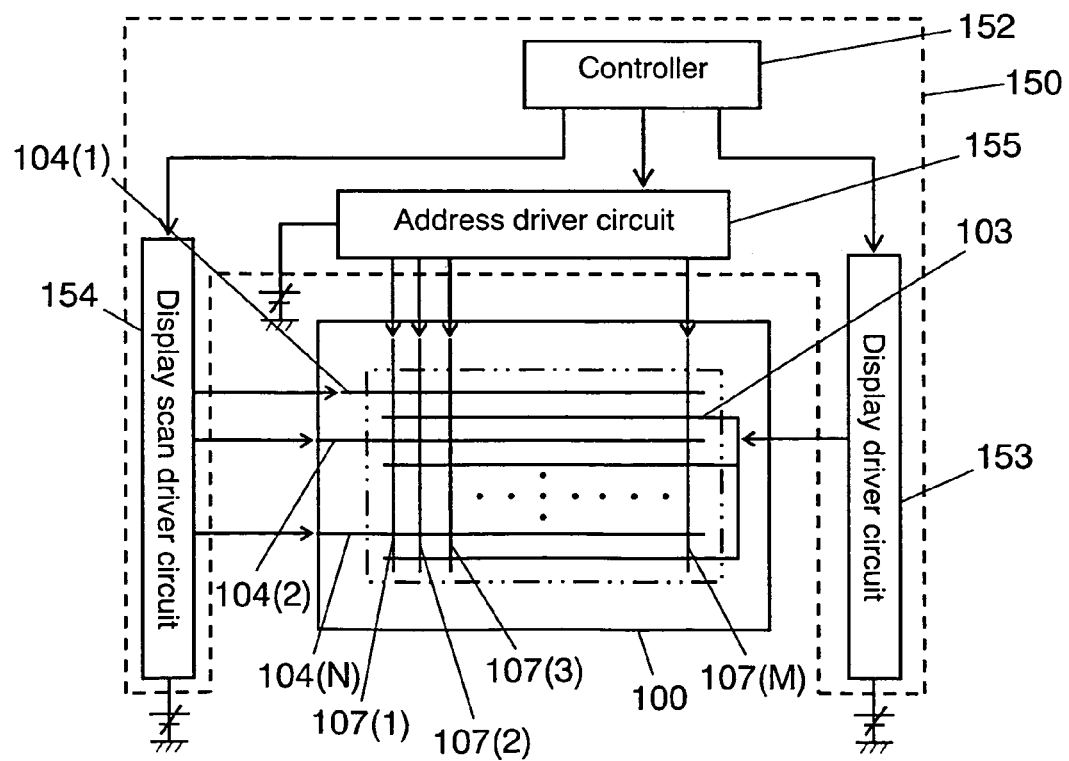
FIG. 3 is a block diagram of the plasma display device according to the embodiment of the present invention.

As shown in FIG. 3, the plasma display device has display driver circuit 153, display scan driver circuit 154, and address driver circuit 155, all in PDP 100. A discharge voltage is applied to display scan electrode 104 and address electrode 107 corresponding to a cell to be emitted, under control of controller 152, to perform address discharge between the electrodes. After that, a pulse voltage is applied between display electrode 103 and display scan electrode 104 to perform sustain discharge. This sustain discharge causes ultraviolet light to occur at a relevant cell. A phosphor layer excited by this ultraviolet light emits light to light the cell. A combination of emitted and non-emitted cells in each color displays an image.

Next, a description will be made of a method of producing the above-mentioned PDP 100, referring to FIGS. 4 and 5.

Figure 4:
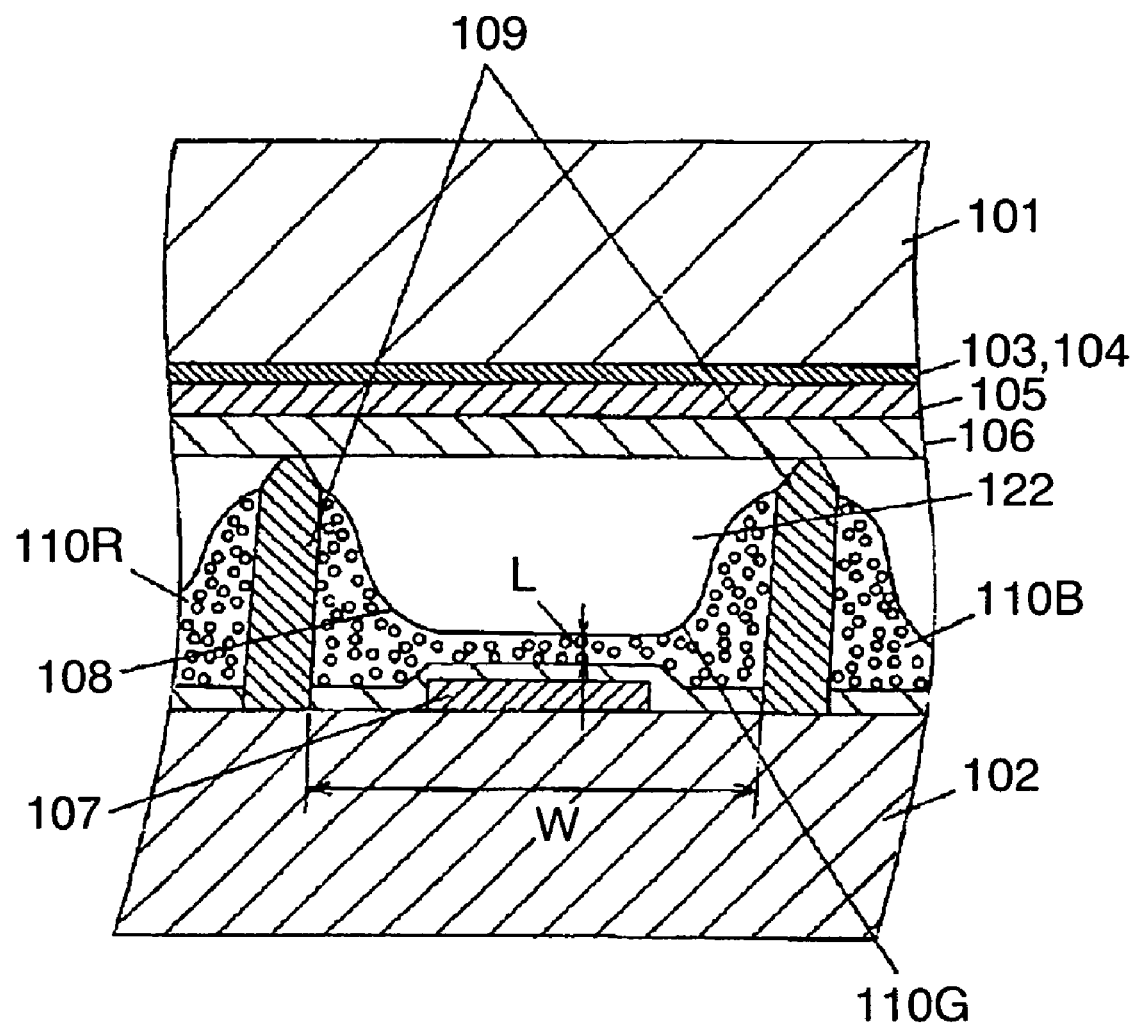
FIG. 4 is a sectional view illustrating the structure of the image display area of the PDP used for the plasma display device according to the embodiment of the present invention.

FIG. 4 is a sectional view illustrating the structure of the image display area of the PDP used for the plasma display device according to the embodiment of the present invention. In FIG. 4, the front panel is produced in the following way. That is, after forming display electrode 103 and display scan electrode 104, N pieces each (only two pieces each are shown in FIG. 2.), alternately and parallel in a striped form on front glass substrate 101, cover the top of them with dielectric glass layer 105, and further form MgO protective layer 106 on the surface of dielectric glass layer 105.

Display electrode 103 and display scan electrode 104 are composed of a transparent electrode made of indium tin oxide (ITO) and a bus electrode made of silver. The silver paste for the bus electrode is formed by being applied with screen-printing and then fired.

Dielectric glass layer 105 is formed so that it will have a given thickness (approximately 20 µm), from a paste including a lead-based glass material being applied with screen-printing and then fired at a given temperature for a given time (at 560° C. for 20 minutes, for example). A paste including the above-mentioned lead-based glass material is, for example, a mixture of PbO (70 wt %), $B_2O_3$ (15 wt %), $SiO_2$ (10 wt %), $Al_2O_3$ (5 wt %), and an organic binder (10% ethyl cellulose dissolved in alpha-terpineol). Here, an organic binder means a resin dissolved in an organic solvent, where an acrylic resin, besides ethyl cellulose, can be used as a resin, and butylcarbitol or the like can be also used as an organic solvent. Further, such a organic binder may immix glyceryl trileate, for example.

MgO protective layer 106, made of magnesium oxide (MgO), is formed so that the layer will have a given thickness (approximately 0.5 µm) with a method such as sputtering or chemical vapor deposition (CVD).

The back panel is formed into a state where M pieces of address electrodes 107 are installed in a row, from a silver paste for electrodes being screen-printed onto rear glass substrate 102 and then fired. A paste including a lead-based glass material is applied on the back panel with screen-printing to form dielectric glass layer 108. In the same way, barrier rib 109 is formed from a paste including a lead-based glass material being applied repeatedly at a given pitch with screen-printing and then fired. This barrier rib 109 partitions discharge space 122 line-wise into each cell (unit of light-emitting region). Further, W, which is the gap between barrier ribs 109, is defined as between approximately 130 µm and 240 µm according to a high-definition TV with its screen size between 32 inches and 50 inches.

In addition, phosphor layers in red (R), blue (B), green (G) are formed in the grooves between barrier ribs 109. Green phosphor layer 110G is formed with a green phosphor, which is pre-fired $Zn_2SiO_4$:Mn powder with its element ratio of Zn/Si of 2.1/1 to 2.0/1, the periphery of which is shielded with ZnO, fired at 1,000° C. to 1,350° C. in an atmosphere of at least one of $N_2$, $N_2$—$O_2$, and $N_2$—$H_2$.

Phosphor layers 110R, 110G, and 110B, where phosphor particles are bound each other, are formed from a phosphor ink paste made of phosphor particles and an organic binder being applied and then fired at 400° C. to 590° C. to burn out the organic binder. It is desirable to form phosphor layers 110R, 110G, and 110B, so that L, which is the lamination-wise thickness of the layers on address electrode 107, will be roughly 8 to 25 times the average particle diameter of the phosphor particles in each color. In other words, the phosphor layer desirably retains a thickness of at least 8 layers, and preferably about 20 layers of lamination, in order not to let ultraviolet light generated in the discharge space transmit but to be eliminated, for ensuring luminance (emission efficiency), when irradiating the phosphor layer with a certain amount of ultraviolet light. This is because the emission efficiency of the phosphor layer is almost saturated, and the size of discharge space 122 cannot be adequately ensured with a thickness more than the above.

Meanwhile, phosphor particles which are spherical and small enough in their diameter, such as those produced with a hydrothermal synthesis method or the like, raise the filling density of the phosphor layers and increase the total surface area of the phosphor particles, as compared to the case of unspherical particles and the same levels of lamination. Consequently, the surface area of phosphor particles involved in actual light-emitting increases, thus further raising the emission efficiency.

The front and back panels produced in this way overlap each other so that respective electrodes on the front panel will be orthogonalized with the address electrodes on the back panel. In addition, the panels are sealed with sealing glass inserted to the periphery of the panels and then fired at approximately 450° C. for 10 to 20 minutes, for example, to form hermetic seal layer 121. Next, after the inside of discharge space 122 is once exhausted to a high vacuum (e.g. $1.1 \times 10^{-4}$ Pa), discharge gas such as an He—Xe-based or He—Xe-based inactive gas is encapsulated at a given pressure, producing PDP 100.

Figure 5:
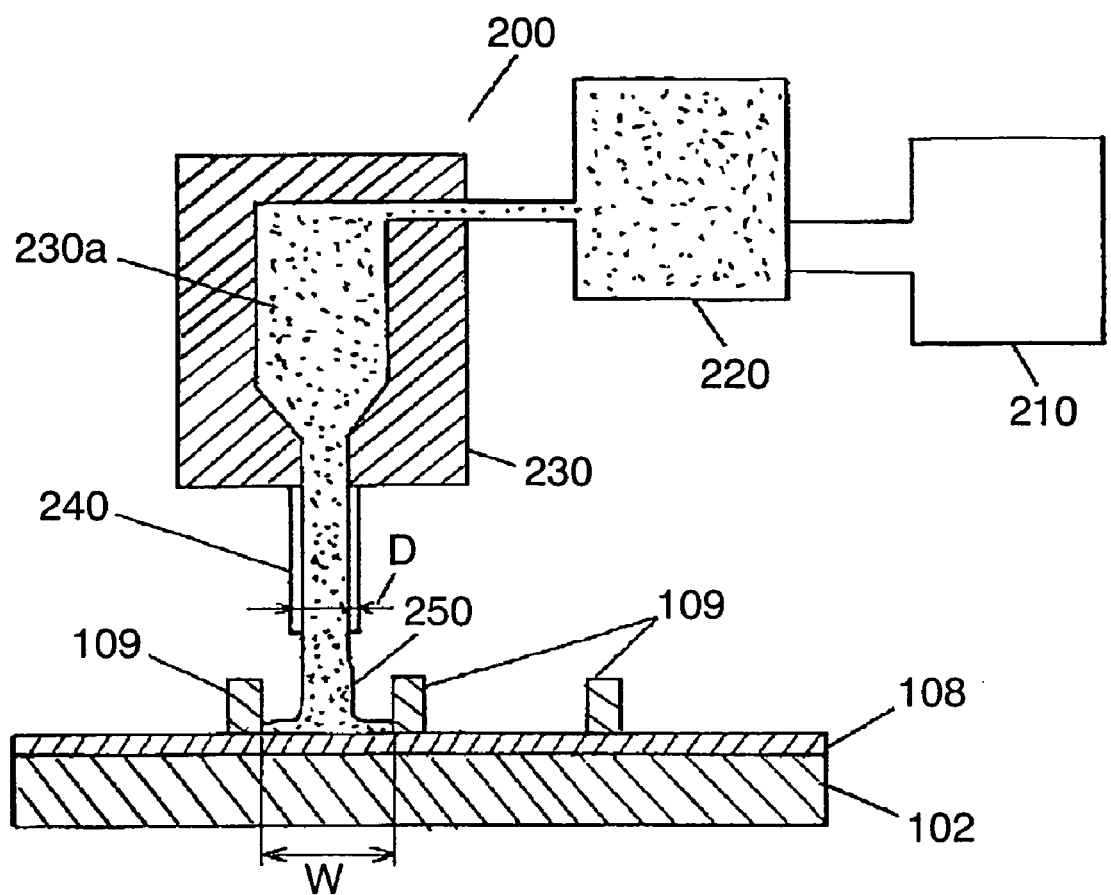
FIG. 5 is an outline block diagram of an ink dispenser used for forming a phosphor layer of the PDP.

FIG. 5 is an outline block diagram of ink dispenser 200 used when forming phosphor layers 110R, 110G, and 110B. As shown in FIG. 5, ink dispenser 200 includes server 210, pressure pump 220, and header 230. Phosphor ink supplied from server 210 for storing phosphor ink, and pressurized by pressure pump 220, is supplied to header 230. Header 230 is provided with ink chamber 230a and nozzle 240, and the pressurized phosphor ink supplied to ink chamber 230a is discharged continuously through nozzle 240. D, which is the bore of this nozzle 240, is desirably 30 μm or more for preventing clogging in the nozzle, and is equal to W (approximately 130 μm to 200 μm) or less, where W is the gap between barrier ribs 109, for preventing the nozzle from protruding from barrier rib 109 when applying, where it is set usually between 30 μm to 130 μm.

Header 230 is linearly driven by a header scanning mechanism (not illustrated). Having header 230 scan as well as continuously discharging phosphor ink 250 through nozzle 240 allows the phosphor ink to be uniformly applied to the grooves between barrier ribs 109 on rear glass substrate 102. Here, the viscosity of the phosphor ink used is maintained between 1,500 centipoise (CP) and 50,000 CP at 25° C.

Still, above-mentioned server 210 is equipped with an agitation device (not illustrated), which prevents the particles in the phosphor ink from being precipitated. Further, header 230 is integrally molded with ink chamber 230a and nozzle 240 included, and is produced from a metallic material with machining and electric discharging Further, a method of forming a phosphor layer is not limited to the above-mentioned method, but various methods can be used such as a photolithographic method, screen-printing, and a method in which a film with phosphor particles mixed is allocated.

Phosphor ink is a mixture of phosphor particles in each color, a binder, and a solvent, all blended so that the viscosity will range between 1,500 centipoise (CP) and 50,000 CP, where a surface active agent, silica, dispersant (0.1 wt % to 5 wt %), and others may be added as required.

A red phosphor blended in this phosphor ink is a compound expressed by $(Y, Gd)_{1-x}BO_3:Eu_x$ or $Y_2O_3:Eu_x$. These are compounds in which Eu is substituted for a part of Y element composing its maternal material. Here, x, which is the substitution value of Eu element for Y element, desirably ranges as $0.05 \leq x \leq 0.20$. For a substitution value more than this, the luminance significantly degrades, although it increases, which is assumed to be impractical. Meanwhile, for a substitution value less than this, the composition ratio of Eu, the main element of light-emitting, decreases, as well as the luminance, thus making it useless as a phosphor.

A green phosphor uses a compound expressed by $[(Zn_{1-x}Mn_x)_2SiO_4]$, that is pre-fired with its element ratio of Zn/Si of 2.1/1 to 2.0/1, and then fired in an atmosphere of $N_2$, $N_2$—$H_2$, and/or $N_2$—$O_2$, shielded with ZnO. $[(Zn_{1-x}Mn_x)_2SiO_4]$ is a compound in which Mn is substituted for a part of Zn element composing its maternal material. Here, x, which is the substitution value of Mu element for Zn element, desirably ranges as $0.01 \leq x \leq 0.20$.

A blue phosphor uses a compound expressed by $Ba_{1-x}MgAl_{10}O_{17}:Eu_x$ or $Ba_{1-x-y}Sr_yMgAl_{10}O_{17}:Eu_x$. $Ba_{1-x}MgAl_{10}O_{17}:Eu_x$ and $Ba_{1-x-y}Sr_yMgAl_{10}O_{17}:Eu_x$ are compounds in which Eu or Sr is substituted for a part of Ba element composing its maternal material. Here, x and y, which are substitution values of Eu element for Ba element, desirably range as $0.03 \leq x \leq 0.20$ and $0.1 \leq y \leq 0.5$.

Further, as a binder blended in a phosphor ink, ethyl cellulose or acrylic resin (0.1 wt % to 10 wt % of ink is mixed) can be used; and as a solvent, alpha-terpineol or butylcarbitol can be used. Here, the binder may be polymer molecules such as PMA or PVA, and the solvent may be an organic solvent such as diethylene glycol or methyl ether.

In this embodiment, phosphor particles are manufactured with a solid-phase reaction method, an aqueous solution method, a spray firing method, or a hydrothermal synthesis method. A concrete example of a method of producing phosphor particles will be hereinafter described.

First, a description will be made of a method of producing a blue phosphor of $Ba_{1-x}MgAl_{10}O_{17}:Eu_x$ with an aqueous solution method.

In the process of producing a mixed solution, mix the raw materials of barium nitrate $Ba(NO_3)_2$, magnesium nitrate $Mg(NO_3)_2$, aluminum nitrate $Al(NO_3)_3$, and europium nitrate $Eu(NO_3)_2$, with the molar ratio of 1−x : 1:10: x ($0.03 \leq x \leq 0.25$), and dissolve them into an aqueous medium to produce a mixed solution. This aqueous medium is desirably ion-exchanged water or pure water in that they do not include an impure substance; however, they can be used even if they include a nonaqueous solvent (e.g. methanol, ethanol). Next, put the hydrate liquid mixture into a container made of a material with resistance to corrosion and heat, such as gold or platinum, and then use a device capable of heating under pressure, such as an autoclave, to perform hydrothermal synthesis (for 12 to 20 hours) at a given temperature (100° C. to 300° C.), at a given pressure (0.2 MPa to 10 MPa), in a high-pressure container. Next, fire this powder in a reducing atmosphere (e.g. atmosphere including 5% of hydrogen and 95% of nitrogen) at a given temperature, for a given time (e.g. at 1,350° C. for two hours), and classify this, to produce a desired blue phosphor $Ba_{1-x}MgAl_{10}O_{17}:Eu_x$.

Phosphor particles produced with hydrothermal synthesis are spherical and have particle diameters smaller than those produced with the conventional solid-phase reaction, resulting in an average particle diameter of approximately 0.05 μm to 2.0 μm. Here, "spherical" is defined as the aspect ratio (minor axis diameter/major axis diameter) of most phosohor particles ranges between 0.9 and 1.0, for example, where all the phosphor particles do not necessarily fall in this range.

Meanwhile, a blue phosphor can be produced with spraying also, in which the hydrate mixture is not put into a gold or platinum container, but the mixture is sprayed through a nozzle to a high-temperature oven, to synthesize a phosphor.

Next, a description will be made of a method of producing a blue phosphor of $Ba_{1-x-y}Sr_yMgAl_{10}O_{17}:Eu_x$ manufactured with a solid-phase reaction method.

Weigh raw materials of barium hydroxide $Ba(OH)_2$, strontium hydroxide $Sr(OH)_2$, magnesium hydroxide $Mg(OH)_2$, aluminum hydroxide $Al(OH)_3$, and europium hydroxide $Eu(OH)_2$, for a required molar ratio, and mix them along with $AlF_3$ as flux. After that, fire them at a given temperature (1,300° C. to 1,400° C.), for a given time (12 to 20 hours) to produce $Ba_{1-x-y}Sr_yMgAl_{10}O_{17}:Eu_x$ in which quadrivalent ions are substituted for Mg and Al. The average particle diameter of the phosphor particles produced with this method is approximately 0.1 μm to 3.0 μm. Next, after firing these in a reducing atmosphere, 5% hydrogen and 95% nitrogen, for example, at a given temperature (1,000° C. to 1600° C.), for a given time (two hours), classify them with an air classifier to produce phosphor powder.

Here, oxide, nitrate salt, and hydroxide are mainly used as raw materials for a phosphor. However, a phosphor can be produced also with an organometallic compound including elements such as Ba, Sr, Mg, Al, and Eu (e.g. metal alkoxide and acetylacetone).

Figure 6:
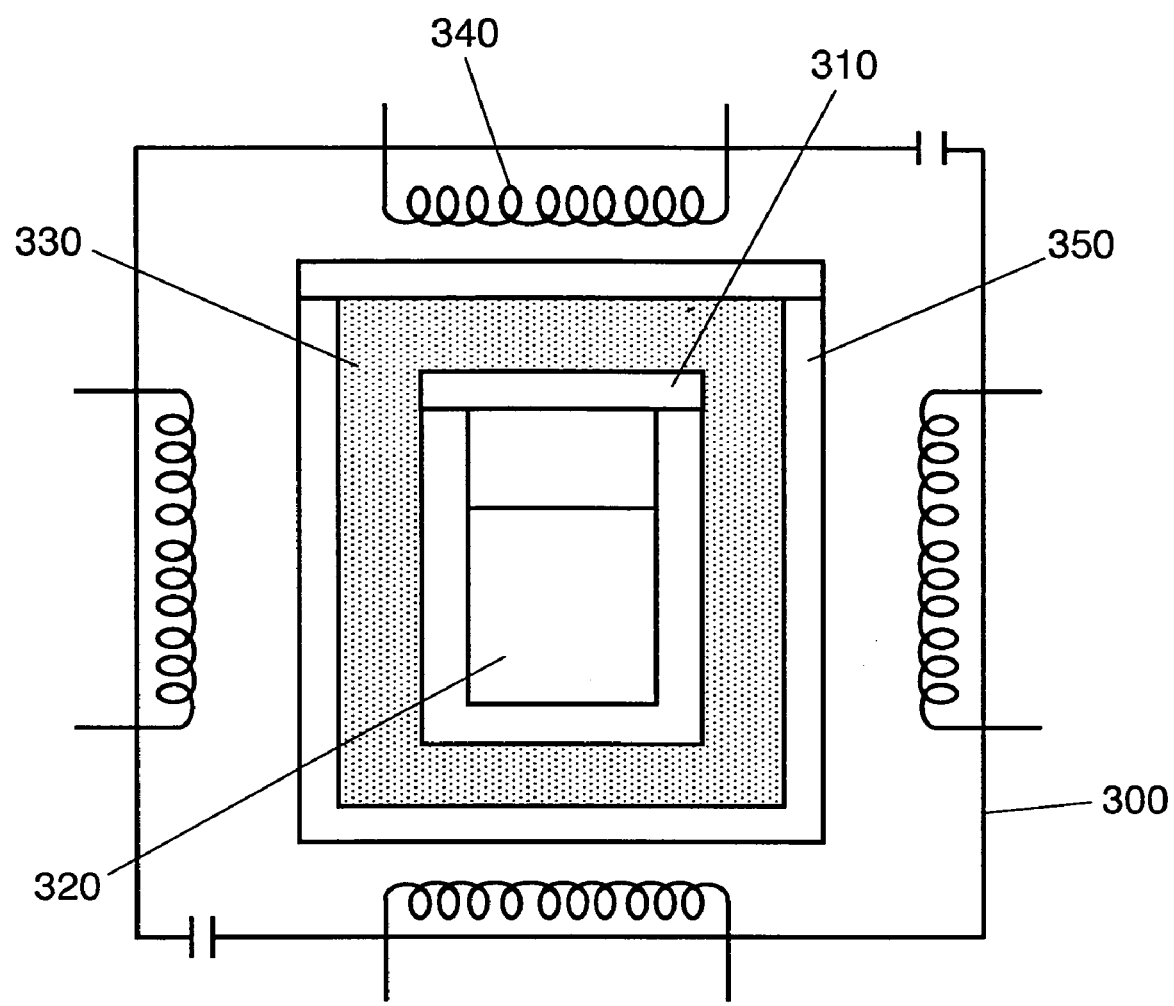
FIG. 6 is an outline sectional view of a firing oven used when actually firing a green phosphor.

Next, a description will be made of a method of producing a green phosphor of $(Zn_{1-x}Mn_x)_2SiO_4$. FIG. 6 is an outline sectional view of a firing oven used when actually firing a green phosphor. In FIG. 6, firing oven body 300, a kind of electric oven, is composed of first crucible 310 made of ZnO or $Al_2O_3$; ZnO powder 330, enclosing crucible 310; second crucible 350 made of ZnO or $Al_2O_3$, containing first crucible 310 and ZnO powder 330; and heater 340 provided on the outer edge, where first crucible 310 contains pre-fired phosphor powder 320 therein.

First, a description will be made of the case where a green phosphor is produced with a solid-phase method. Mix the raw materials of zinc oxide (ZnO), silicon oxide ($SiO_2$), and manganese oxide MnO, so that the molar ratio of Zn to Mn will be 1:x:x ($0.01 \leq x \leq 0.20$), and next mix the raw materials along with flux ($ZnF_2$ and $MnF_2$) as required, so that the element ratio of Zn to Si will be 2.1/1 to 2.0/1. Pre-fire this mixture at 650° C. to 900° C. for two hours. Next, lightly crush the mixture to the extent of breaking the agglomerate, put it into first crucible 310 made of $Al_2O_3$ or ZnO, enclose it with ZnO powder 330 and ZnO crucible 350, and fire them in an atmosphere including at least one of $N_2$, $N_2$—$O_2$, and $N_2$—$H_2$, at 1,000° C. to 1,350° C., to produce a green phosphor. At this moment, if an arrangement is made so that heater 340 of the oven will be located at the periphery of second crucible 350 made of ZnO and/or ZnO powder 330, the temperature of first crucible 310, second crucible 350, and ZnO powder 330 can be made slightly higher than that of pre-fired phosphor powder 320 made of $Zn_2SiO_4$:Mn. Power control of heater 340 at the periphery of second crucible 350, and flow adjustment of an ambient gas of $N_2$, $N_2$—$O_2$, and/or $N_2$—$H_2$ control the respective temperatures of second crucible 350, first crucible 310, ZnO powder 330, and pre-fired phosphor powder 320 of $Zn_2SiO_4$:Mn, for actually firing. Here, in this embodiment, the description is made of the case where an electric oven is used. However, a gas oven or the like may be used.

Next, a description will be made of the case where a green phosphor is produced with an aqueous solution method. In the process of producing a mixed solution, mix the raw materials of zinc nitrate $Zn(NO_3)_2$, manganese nitrate $Mn(NO_3)_2$, and ethyl silicate[$Si(O.C_2H_5)_4$], so that the molar ratio of zinc nitrate to manganese nitrate will be 1−x:x ($0.01 \leq x \leq 0.20$). Next, in blending $Zn(NO_3)_2$ and [$Si(O.C_2H_5)_4$], mix the raw materials so that the element ratio of Zn to Si will be 2.1/1 to 2.0/1, and put them into ion-exchanged water to produce a mixed solution. Next, in a hydration process, drop a basic aqueous solution such as an aqueous ammonia solution into this mixed solution to form hydrate. Pre-fire this hydrate at 600° C. to 900° C., and next, in the same way as in the solid-phase method, put this pre-fired matter in first crucible 310 made of $Al_2O_3$ or ZnO, enclose the periphery of this first crucible 310 with ZnO powder 330 and second crucible 350 in an atmosphere of $N_2$, $N_2$—$O_2$, and/or $N_2$—$H_2$ at 1,000° C. to 1,350° C., to produce a green phosphor.

Next, a description will be made of a method of producing a red phosphor with an aqueous solution method.

First, a red phosphor of $(Y, Gd)_{1-x}BO_3:Eu_x$ will be described. In the process of producing a mixed solution, mix the raw materials of yttrium nitrate $Y_2(NO_3)_3$, hydro nitrate gadolinium $Gd_2(NO_3)_3$, boric acid $H_3BO_3$, and europium nitrate $Eu_2(NO_3)_3$, so that the molar ratio will be 1−x :2:x ($0.05 \leq x \leq 0.20$) (The ratio of Y to Gd is 65:35), and after heat-treating them at 1,200° C. to 1,350° C. in the air, classify them to produce a red phosphor.

Meanwhile, for a red phosphor of $Y_{2x}O_3:Eu_x$, in the process of producing a mixed solution, dissolve the raw materials of yttrium nitrate $Y_2(NO_3)_2$ and europium nitrate $Eu(NO_3)_2$ into ion-exchanged water, so that the molar ratio will be 2−x:x($0.05 \leq x \leq 0.30$), to produce a mixed solution. Next, in a hydration process, add a basic aqueous solution (e.g. aqueous ammonia solution) to this aqueous solution to form hydrate. After that, in a hydrothermal synthesis process, put the hydrate and ion-exchanged water into a container with resistance to corrosion and heat, such as platinum or gold, and then perform hydrothermal synthesis in a high-pressure container such as an autoclave, at 100° C. to 300° C. at a pressure of 0.2 MPa to 10 MPa for 3 to 12 hours. After that, dry the yielded compound to produce desired $Y_{2x}O_3:Eu_x$. Next, after annealing this phosphor in the air at 1,300° C. to 1,400° C. for two hours, classify it to form a red phosphor.

Here, the above-mentioned phosphor layers 110R and 110B of PDP 100 use those having been used conventionally, and phosphor layer 110G uses green phosphor particles with its surface of [$(Zn_{1-x}Mn_x)_2SiO_4$] composing the positively charged phosphor.

EVALUATION EXPERIMENT

Hereinafter, in order to evaluate the performance of the plasma display device according to the present invention, an evaluation experiment is made for a sample device using a phosphor according to the above-mentioned embodiment.

The respective plasma display devices are produced so that they will have a 42-inch size (specification of high-definition TV with its rib pitch of 150 μm), the thickness of the dielectric glass layer is 20 μm, the thickness of the MgO protective layer is 0.5 μm, and the distance between the display electrode and display scan electrode is 0.08 mm. Further, the discharge gas to be encapsulated in the discharge space is a neon-based gas with a xenon gas mixed by 5%, encapsulated at a given discharge-gas pressure.

$Zn_2SiO_4$:Mn green phosphor particles used for sample plasma display devices 1 through 10 adopt a [$(Zn_{1-x}Mn_x)_2SiO_4$] phosphor produced as follows: That is, put pre-fired powder of a phosphor with its element ratio of Zn to Si of 2.1/1 to 2.0/1 into first crucible 310 made of $Al_2O_3$ or ZnO, enclose the periphery of this crucible with ZnO powder 330 and second crucible 350, and then fire them in an atmosphere of $N_2$, $N_2$—$O_2$, and/or $N_2$—$H_2$ at 1,000° C. to 1,350° C. Table 1 shows the conditions of synthesis for each phosphor used in these samples.

TABLE 1

| Sample number | Amount of Mn: x | Element ratio of Zn/Si as raw materials | Pre-firing temperature (° C.) | Firing atmosphere and firing temperature | Crucible for pre-fired powder and its arrangement |
|---|---|---|---|---|---|
| | | Green phosphor [$(Zn_{1-x}Mn_x)_2SiO_4$] Solid-phase method | | | |
| 1 | x = 0.02 | 2.1/1 | In the air, 600° C., 2 hours | In $N_2$, 1,200° C., 3 hours | ZnO crucible, cover the periphery with ZnO powder |
| 2 | x = 0.05 | 2.07/1 | In the air, 750° C., 2 hours | In $N_2$—$H_2$, 1,350° C., 3 hours | $Al_3O_2$ crucible, cover the periphery with ZnO powder |
| 3 | x = 0.1 | 2.04/1 | In the air, 850° C., 2 hours | In $N_2$, 1,150° C., 3 hours | ZnO crucible, cover the periphery with ZnO powder |
| 4 | x = 0.2 | 2.0/1 | In the air, 900° C., 2 hours | In $N_2$—$O_2$ 1,000° C., 10 hours | Cover ZnO crucible with ZnO crucible and fill therebetween with ZnO |
| | | Green phosphor [$(Zn_{1-x}Mn_x)_2SiO_4$] Liquid-phase method | | | |
| 5 | x = 0.01 | 2.0/1 | In the air, 700° C., 3 hours | In $N_2$, 1,300° C., 3 hours | ZnO crucible, cover the periphery with ZnO powder |
| 6 | x = 0.03 | 2.03/1 | In the air, 800° C., 3 hours | (same as the above) | (same as the above) |
| 7 | x = 0.05 | 2.01/1 | (same as the above) | (same as the above) | (same as the above) |
| 8 | x = 0.1 | (same as the above) | (same as the above) | (same as the above) | (same as the above) |
| 9 | x = 0.05 | (same as the above) | (same as the above) | (same as the above) | (same as the above) |
| 10* | (same as the above) | 1.9/1 | (same as the above) | (same as the above) | (same as the above) |
| 11* | (same as the above) | 2.2/1 | (same as the above) | (same as the above) | (same as the above) |
| 12* | (same as the above) | 2.0/1 | (same as the above) | (same as the above) | Put only pre-fired powder into $Al_3O_2$ crucible |
| 13* | (same as the above) | (same as the above) | (same as the above) | In $N_2$—$O_2$ 900° C., 10 hours | ZnO crucible, cover the periphery with ZnO powder |

| Sample number | Amount of Eu: x | Method of manufacturing | Amount of Mn: x | Method of manufacturing |
|---|---|---|---|---|
| | Red phosphor [$(Y, Gd)_{1-x}BO_3:Eu_x$] | | Blue phosphor [$Ba_{1-x}MgAl_{10}O_{17}:Eu_x$] | |
| 1 | x = 0.1 | Solid-phase reaction method | x = 0.1 | Solid-phase reaction method |
| 2 | x = 0.2 | (same as the above) | x = 0.2 | (same as the above) |
| 3 | x = 0.3 | Aqueous solution method | x = 0.5 | (same as the above) |
| 4 | x = 0.15 | (same as the above) | x = 0.1 | (same as the above) |
| | Red phosphor [$(Y_{1-x})_2O_3:Eu_x$] | | Blue phosphor [$Ba_{1-x-y}Sr_yMgAl_{10}O_{17}:Eu_x$] | |
| 5 | x = 0.01 | Aqueous solution method | x = 0.2, y = 0.1 | Aqueous solution method |
| 6 | x = 0.1 | (same as the above) | x = 0.3, y = 0.3 | (same as the above) |
| 7 | x = 0.15 | (same as the above) | x = 0.4, y = 0.5 | (same as the above) |
| 8 | x = 0.2 | Solid-phase reaction method | x = 0.5, y = 0.3 | (same as the above) |
| 9 | (same as the above) | (same as the above) | x = 0.15, y = 0.5 | (same as the above) |
| 10* | (same as the above) | (same as the above) | (same as the above) | (same as the above) |

TABLE 1-continued

| | | | | |
|---|---|---|---|---|
| 11* | (same as the above) | (same as the above) | (same as the above) | (same as the above) |
| 12* | (same as the above) | (same as the above) | (same as the above) | (same as the above) |
| 13* | (same as the above) | (same as the above) | (same as the above) | (same as the above) |

*Sample numbers 10 through 13 are for comparative examples.

In samples 1 through 4, a green phosphor is a combination using $(Zn_{1-x}Mn_x)_2SiO_4$ produced with a solid-phase synthesis method; a red phosphor, $(Y, Gd)_{1-x}BO_3:Eu_x$; and a blue phosphor, $(Ba_{1-x}MgAl_{10}O_{17}:Eu_x)$. Each sample shows the variation in the method of synthesizing a phosphor; substitution ratios of Mn and Eu, which are the main elements for light-emitting, namely substitution ratio of Mn to Zn element and substitution ratio of Eu to Y and Ba elements; and the element ratio of Zn to Si and firing conditions for a green phosphor, as shown in table 1.

In samples 5 through 9, a green phosphor is a combination using $(Zn_{1-x}Mn_x)_2SiO_4$ produced with liquid-phase method (aqueous solution method); a red phosphor, $(Y_{1-x})_2O_3:Eu_x$; and a blue phosphor, $Ba_{1-x-y}Sr_yMgAl_{10}O_{17}:Eu_x$. Each sample shows the variation in the method of synthesizing a phosphor; and the element ratio of Zn to Si and firing conditions for a green phosphor, as shown in table 1.

Further, phosphor ink used for forming a phosphor layer is produced by mixing a phosphor, resin, solvent, and dispersant, using each phosphor particle shown by table 1.

The measurement result shows that the viscosity of the phosphor ink at that time (25° C.) all remains in the range between 1,500 CP and 50,000 CP. In all the phosphor layers formed, the side faces of the barrier ribs are found by observation to be uniformly coated with phosphor ink.

Further, the bore of the nozzle used for coating then is 100 μm, and phosphor particles used for the phosphor layer have an average particle diameter of 0.1 μm to 3.0 μm and a maximum particle size of 8 μm or less.

Sample 10 is a comparative sample with its element ratio of Zn/Si of 1.9/1 when blending raw materials for a green phosphor; and sample 11, in the same way, of Zn/Si of 2.2/1. Sample 12 is a green phosphor in the conventional example, with its element ratio of Zn/Si of 2.0/1 when blending raw materials, fired only with a regular crucible (made of $Al_2O_3$). In sample 13, the ratio of Zn/Si when blending raw materials for a green phosphor is 2.0/1, the firing temperature for pre-fired powder is the same as in the present invention, a crucible made of ZnO is covered with ZnO powder, but the temperature when actually firing is set to as low as 900° C.

Experiment 1

A measurement is made of the charging tendency for the green phosphors of samples 1 through 9 and comparative sample 10. Here, the measurement adopts a blow-off method, which measures the amount of charge for reduced iron powder.

Experiment 2

A measurement is made of the element ratio of Zn to Si at the proximity (approximately 10 nm) of the surface with X-Ray photoelectron spectroscopy (XPS) for samples 1 through 9 and comparative sample 10 produced.

Experiment 3

A measurement is made of the luminance of a PDP in fully white after the PDP producing process, and the luminance of green and blue phosphor layers, with a luminance meter.

Experiment 4

A measurement is made of the luminance degradation factor when displaying full white, green, and blue as follows: That is, continuously apply discharge sustain pulses with 185 V, 100 kHz, to a plasma display device for 1,000 hours, measure the luminance of the PDP before and after then, and calculate the luminance degradation factor (<[luminance after application−luminance before application]/ luminance before application >100)

An address error during address discharge is judged from at least a single flicker on the screen.

Experiment 5

Clogging in the nozzle is checked when green phosphor ink is applied using a nozzle with its bore of 100 μm, for 100 hours continuously.

Table 2 shows experimental results of the luminance and luminance degradation factor, and of clogging in the nozzle, for green phosphors in experiments 1 through 5.

TABLE 2

| Sample number | Zn/Si ratio of green phosphor with XPS and charging tendency | | Luminance of panel in green | Rate of luminance change (%) of panel after discharge sustain pulses with 185 V, 100 kHz applied for 1,000 hours | | Address error during address discharge | Clogging in nozzle (200 hours) |
|---|---|---|---|---|---|---|---|
| | Zn/Si ratio | Charging endency | Cd/cm² | Green | Blue | | |
| 1 | 2.09/1 | + | 250.0 | −1.2 | −2.9 | No | No |
| 2 | 2.06/1 | + | 265.0 | −1.5 | −2.6 | (same as the above) | (same as the above) |
| 3 | 2.03/1 | + | 270.0 | −1.1 | −2.8 | (same as the above) | (same as the above) |
| 4 | 2.01/1 | + | 245.0 | −1.3 | −2.6 | (same as the above) | (same as the above) |
| 5 | 2.01/1 | + | 242.0 | −1.5 | 0 | (same as the above) | (same as the above) |

TABLE 2-continued

| Sample number | Zn/Si ratio of green phosphor with XPS and charging tendency | | Luminance of panel in green | Rate of luminance change (%) of panel after discharge sustain pulses with 185 V, 100 kHz applied for 1,000 hours | | Address error during address discharge | Clogging in nozzle (200 hours) |
|---|---|---|---|---|---|---|---|
| | Zn/Si ratio | Charging endency | Cd/cm² | Green | Blue | | |
| 6 | 2.02/1 | + | 257.0 | −1.8 | −2.7 | (same as the above) | (same as the above) |
| 7 | 2.0/1 | 0 | 273.0 | −1.7 | −2.3 | (same as the above) | (same as the above) |
| 8 | 2.0/1 | 0 | 271.0 | −1.9 | −2.4 | (same as the above) | (same as the above) |
| 9 | 2.0/1 | 0 | 273.0 | −1.6 | −2.5 | (same as the above) | (same as the above) |
| 10* | 1.90/1 | − | 253.0 | −25.8 | −4.8 | Yes | Yes |
| 11* | 2.19/1 | + | 203 | −2.9 | −3.6 | No | No |
| 12* | 1.92/1 | − | 249 | −28.3 | −5.1 | Yes | Yes |
| 13* | 1.98/1 | − | 185 | −18.6 | −5 | (same as the above) | (same as the above) |

*Sample numbers 10 through 13 are for comparative examples.

As shown in table 2, in comparative sample 10, the element ratio of Zn to Si as raw materials is 1.9/1, and Si in $Zn_2SiO_4$:Mn is richer in the ratio of Zn/Si as compared to the stoichiometric ratio. Therefore, sample 10 is negatively charged, the luminance of the panel in green and blue largely degrades, and an address error and clogging in the nozzle occur. In sample 11, the ratio of Zn to Si as raw materials is 2.2/1, which means sample 11 is rich in Zn and the powder is positively charged. However, sample 11 is richer in Zn as compared to the stoichiometric ratio, and thus the phosphor becomes deteriorated in crystallization and the panel in blue has a low luminance. Meanwhile, comparative sample 12 is a green phosphor produced with the conventional producing method, and thus ZnO sublimes selectively from the surface, sample 12 is in Si with the Zn/Si ratio of 1.92/1, to be negatively charged, the luminance of the panel in green in an accelerated life largely degrades, and an address error and clogging in the nozzle occur. In comparative sample 13, where the periphery of the first crucible is covered with ZnO powder, the temperature for actually firing is as low as 900° C., and thus $Zn_2SiO_4$:Mn is insufficiently crystallized, and the panel has a low luminance and large luminance degradation for green.

Meanwhile, the green phosphors according to the present invention in samples 1 through 9, where Zn and Si are blended at the element ratio of Zn/Si of 2.0/1 to 2.1/1, pre-fired powder is put into a crucible, the periphery of which is enclosed with ZnO powder, and produced at 1,000° C. to 1,350° C., are positively charged or zero-charged, and thus the luminance in green and blue slightly degrades, and an address error and clogging in the nozzle when applying phosphors do not occur. This is presumably because positively charging or zero-charging the negatively charged green phosphor causes the phosphor to be immune to an impact of positive ions such as neon ions ($Ne^+$) and $CH_x$-based ions ($CH_x^+$) existing in the discharge space of the panel, suppressing luminance degradation. Here, an impact of ions is slightly reduced for the blue phosphor also.

Further, the reason why address errors have been eliminated is homogenization of address discharge as a result that the green phosphor is positively charged, which is the same as for the red and blue ones. Still, the reason why clogging in the nozzle has been eliminated is presumanly the improved dispersibility of the phosphor ink because the ethyl cellulose in the binder is prone to adsorbing a positively charged green phosphor.

INDUSTRIAL APPLICABILITY

As mentioned above, according to the present invention, a green phosphor $(Zn_{1-x}Mn_x)_2SiO_4$ composing a phosphor layer is positively charged or zero-charged, to homogenize coating condition, to prevent deterioration of the phosphor layer, and also to improve luminance, life, and reliability, of the PDP, thus effectively improving the performance of the plasma display device.

The invention claimed is:

1. A method of producing a phosphor for a plasma display device, comprising:
    a process in which, after dissolving one of nitrate salt and organometallic salt, including elements Zn, Si and Mn composing a green phosphor, in water, a coprecipitate is produced with hydrolysis;
    a pre-firing process in which the coprecipitate is fired in an air at 600° C. to 900° C., to produce pre-fired matter; and
    a firing process in which the pre-fired matter is enclosed by ZnO powder, and the pre-fired matter and the ZnO powder are fired at 1,000° C. to 1,350° C.

2. A method of producing a phosphor for a plasma display device as claimed in claim 1, wherein a temperature of a location on which the pre-fired matter is arranged is lower than that of a location on which the ZnO powder is arranged.

3. A method of producing a phosphor for a plasma display device, comprising:
    a process of mixing a raw material for a phosphor, in which a raw material of oxide and/or carbonate including elements Zn Si and Mn composing a green phosphor, are mixed;
    a pre-firing process in which the mixed raw material is fired in an air at 600° C. to 900° C., to produce pre-fired matter; and
    a firing process in which the pre-fired matter is enclosed by ZnO powder, and the pre-fired matter and the ZnO powder are fired at 1,000° C. to 1,350° C.

4. A method of producing a phosphor for a plasma display device as claimed in claim 3, wherein a temperature of a location on which the pre-fired matter is arranged is lower than that of a location on which the ZnO powder is arranged.

* * * * *